US00RE47494E

(19) United States
(12) Reissued Patent
Catalano

(10) Patent Number: US RE47,494 E
(45) Date of Reissued Patent: Jul. 9, 2019

(54) ELECTROLYSIS PREVENTION DEVICE AND METHOD OF USE

(71) Applicant: Frank Amidio Catalano, Concord, NC (US)

(72) Inventor: Frank Amidio Catalano, Concord, NC (US)

(21) Appl. No.: 14/452,339

(22) Filed: Aug. 5, 2014

Related U.S. Patent Documents

Reissue of:
(64) Patent No.: 8,236,145
Issued: Aug. 7, 2012
Appl. No.: 12/631,903
Filed: Dec. 7, 2009

(51) Int. Cl.
*C23F 13/10* (2006.01)
*C23F 13/18* (2006.01)

(52) U.S. Cl.
CPC ..... *C23F 13/18* (2013.01); *C23F 2201/02* (2013.01); *Y10T 29/4935* (2015.01); *Y10T 428/23* (2015.01)

(58) Field of Classification Search
None
See application file for complete search history.

(56) References Cited

U.S. PATENT DOCUMENTS 1,506,307 A * 8/1924 Kirkaldy ..... 204/196.31
1,514,903 A * 11/1924 Gush ..... 204/196.31
3,012,959 A * 12/1961 Barnard ..... 204/196.11
3,196,101 A * 7/1965 Hosford, Jr. ..... 204/196.34
3,497,444 A * 2/1970 Paiton ..... 204/196.32
4,056,142 A * 11/1977 Baumann et al. ..... 165/133
4,776,392 A * 10/1988 Loyd ..... 204/196.16
5,292,595 A 3/1994 Yamauchi et al.
5,649,591 A * 7/1997 Green ..... 165/134.1
5,910,236 A * 6/1999 Iossel et al. ..... 204/280
6,109,987 A * 8/2000 Watanabe ..... F01P 3/205 134/166 R

FOREIGN PATENT DOCUMENTS

CN 1225998 A * 8/1999 ..... F28D 1/03
JP 01217196 * 8/1989
JP H10246595 A * 9/1998 ..... F28D 9/0043
KR 20090112853 * 10/2009
WO 2005/061393 A1 * 7/2005

OTHER PUBLICATIONS

Notifcation of Reason for Refusal, Korean Intellectual Property Office, application 10-2008-0038583, 4 pages, dated Apr. 2011.*
Fahnestock, Murray; "Radiator Repairs"; Ford Care and Home Repair, How to Enjoy Your Ford Car, 1922 Edition; Trade Press Publishing Co., Milwaukee, Wis., 1922. pp. 2-8. (Year: 1922).*

* cited by examiner

*Primary Examiner* — Sean E Vincent
(74) *Attorney, Agent, or Firm* — Vinson & Elkins L.L.P.

(57) ABSTRACT

An electrolysis prevention device, for preventing corrosion caused by electrolysis, includes a sacrificial anode made of an active metal and an anode holder supporting the sacrificial anode. The holder is adapted to fit around the inlet connection of an engine heat exchange component, such as a radiator or heater core, in such a way as to allow for a hose to be attached overtop the device. The device may be included in an originally-manufactured engine heat exchange component or may be installed later.

47 Claims, 27 Drawing Sheets

211

ELECTROLYSIS PREVENTION DEVICE AND METHOD OF USE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

The present application is a U.S. nonprovisional patent application of, and claims priority under 35 U.S.C. §119(e) to, U.S. provisional patent application Ser. No. 61/120,296, filed Dec. 5, 2008, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

1. Field of the Present Invention

This application relates generally to motor vehicles, whether powered by gas, diesel, electric battery, propane, natural gas, or any other like material, and in particular to radiators and engines and preventing corrosion in the cooling system of said vehicles, especially those with components of dissimilar metal construction which present most cooling system corrosion problems.

2. Background

Automobile cooling systems circulate water and coolant liquids through an engine's water jacket, head, and water pump to facilitate heat transfer. After absorbing the heat, the hot liquid is piped back to the radiator/storage tank which is a liquid to air heat exchanger. A typical radiator is made up of a storage tank either above or to the side of the cooling tubes and exchanged cooling fins. This storage tank has an opening to the interior of the storage tank part, a core of cooling tubes, which is where the coolant liquid flows, and fins, connected to these cooling tubes, which transfer heat to the air that is pulled or pushed through the fins and around the tubes for heat transfer from the coolant to the air passing through.

Radiators and engines were historically made of iron, steel, copper, and/or brass, which, as similar metals, have little corrosion caused by electrolytic activity. Over time, however, aluminum parts have been incorporated into engine thermal control devices, such as radiators and heater cores. While the use of aluminum offers several advantages, an unfortunate side effect of using dissimilar metals is an increase in electrolytic activity, leading to increased vulnerability to corrosion. In response to the electrolytic activity, also known as electrolysis, aluminum components corrode and become porous and may begin to leak in as little as two weeks.

During electrolysis, one of the metals in the system acts as an anode and corrodes. The other metal acts as a cathode and does not corrode. Chemical corrosion inhibitors have been developed to inhibit electrolysis, but they are toxic, present problems to the environment, and present problems of disposal. Alternatively, sacrificial anodes, constructed of active metals, that is metals that react with oxygen, such as magnesium, aluminum, zinc or combinations thereof, have also been used as corrosion inhibitors. Sacrificial anodes do not eliminate the flow of electric current, but instead attract the electric current, acting as a "lightning rod" that electricity clings to, thus relieving the anodic metal of the thermal control device from the corrosive damage of electrolysis.

U.S. Pat. No. 5,292,595 describes a sacrificial anode of specified composition bonded to the core metal to prevent the occurrence of pitting corrosion of core material in a heat exchanger such as a radiator or heater core. Unfortunately such an anode is hard to access to check its condition or replace it when it wears out. A need exists for a corrosion-inhibiting sacrificial anode which is easily accessible. Since a sacrificial anode is designed to be consumed, easy accessibility would allow verification of its effective working status and efficient replacement when depleted.

Furthermore, prior attempts at preventing corrosion in heat exchangers have failed due to the sacrificial anode being installed in undesirable locations. U.S. Pat. No. 5,649,591 describes a sacrificial anode built into a radiator cap. Such a solution is imperfect because some radiators lack caps and, for those that do have caps, the position of the cap is too far from the inlet to effectively prevent corrosion from occurring.

Thus, a need continues to exist to prevent corrosion in radiators and other engine thermal control devices. Current sacrificial anode devices are deficient in that they fail to position the anode optimally to allow for maximal corrosion resistance and easy monitoring, removal, and replacement.

SUMMARY OF THE PRESENT INVENTION

In accordance with a preferred embodiment, the present invention comprises a device to prevent corrosion caused by electrolysis comprised of metal, preferably disposed in or near the inlet hose connection of a radiator, heater core, or other such engine thermal control device.

In features of this aspect, the corrosion prevention device is a sacrificial anode comprised of an active metal such as aluminum, magnesium, or zinc. In some preferred embodiments, the sacrificial anode is clipped to the inner wall of the radiator inlet. In different embodiments, the anode will hang at various distances from the upper lip of the radiator inlet. In other preferred embodiments, the sacrificial anode is constructed into the wall of the radiator near the inlet or built as a plug that may be inserted into a radiator plug opening.

Broadly defined, the present invention according to one aspect is an electrolysis prevention device, for preventing corrosion caused by electrolysis, including: a sacrificial anode made of an active metal; and an anode holder supporting the sacrificial anode; wherein the holder is adapted to fit around the inlet connection of an engine heat exchange component in such a way as to allow for a hose to be attached overtop the device.

In features of this aspect, the sacrificial anode is made of aluminum; the sacrificial anode is made of magnesium; the sacrificial anode is made of zinc; the anode holder is grounded to the vehicle; an end of the anode holder is attached to an additional wire positioning the sacrificial anode further down into the flow of the liquid coolant; the anode holder is connected to the radiator by a clamp; the engine heat exchange component is a radiator; and/or the engine heat exchange component is a heater core.

In another aspect, the present invention is a radiator with an internal sacrificial anode in proximity to an inlet connection thereof.

In yet another aspect, the present invention is a heater core with an internal sacrificial anode in proximity to an inlet connection thereof.

In still another aspect, the present invention is a method of preventing corrosion of an engine heat exchange component comprising adding or installing a sacrificial anode assembly within the heat exchange component adjacent an inlet thereof.

In a feature of this aspect, the engine heat exchange component has an inlet connection, and the method further includes: installing a fitting hole into the tank of the engine heat exchange component adjacent the inlet connection; and filling said fitting hole with a sacrificial anode of the sacrificial anode assembly. In another feature of this aspect, the method further includes attaching the sacrificial anode to the engine heat exchange component within 10 inches of a center of the inlet connection. In a further feature, the method further includes comprising grounding the sacrificial anode by means of an attached ground wire. In a still further feature, the attached ground wire is a "pigtail" clip connecting the sacrificial anode to a wiring harness.

In yet another aspect, the present invention is an electrolysis prevention shield for preventing corrosion caused by electrolysis. The electrolysis prevention shield includes a sheathing of durable insulating material wherein the sheathing of durable insulating material is configured to affix to a protrusion of metal. In a feature of this aspect, the durable insulating material is rubber. In an alternative feature, the durable insulating material is plastic.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1A:
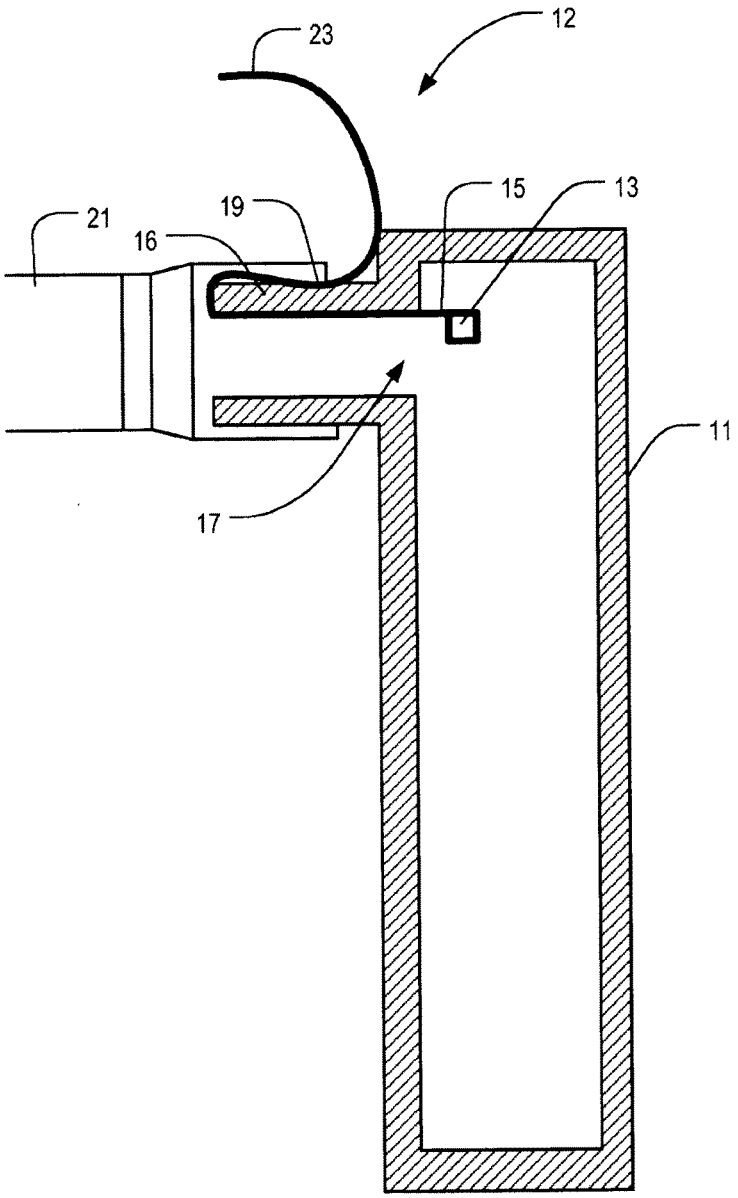
FIG. 1A is a left side cross-sectional view of a radiator having an electrolysis prevention device in accordance with a first preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

As used herein, an "engine heat exchange component" refers to an engine radiator, heater core, or other device for exchanging heat in an engine.

Referring now to the drawings, in which like numerals represent like components throughout the several views, the preferred embodiments of the present invention are next described. The following description of one or more preferred embodiment(s) is merely exemplary in nature and is in no way intended to limit the invention, its application, or uses.

FIG. 1A is a left side cross-sectional view of a radiator 11 having an electrolysis prevention device 12 in accordance with a first preferred embodiment of the present invention. As shown therein, an electrolysis prevention device 12 includes a sacrificial anode 13 supported at the end of a sleeve wire, metal slide, clip 15 or the like such that the anode is disposed adjacent the radiator inlet 17. The anode 13 should be [comprised] *composed* of a metal that reacts strongly with oxygen, also known as an active metal, such as magnesium, aluminum, zinc or combinations thereof. The anode support 19 extends through and out the radiator inlet and is doubled back around the inlet [fitting] *connection* 16. The radiator hose 21 slides over the inlet [fitting] *connection* 16 and is clamped in place. The exposed end 23 of the anode support 19 optionally may be connected via ground wire (not shown) to the wiring harness, a suitable grounded location on the frame or cross member of the vehicle, or the like. However, grounding of the anode is not a necessary aspect of this embodiment, or any embodiment, of the present invention.

Such an assembly 12 can be installed very quickly and can be used in radiators having plastic tanks as well as in radiators having aluminum tanks Furthermore, a smaller version may be utilized with heater cores (not shown). The radiators 11 can be of any conventional type, including the "crossflow" type, meaning the tanks 33 are on the sides (see FIG. 1B), the "downflow" type, meaning the tanks 33 are on top or bottom (see FIG. 1C), the "double pass" type, meaning that both connections (inlet and outlet) are on one side of the radiator (not shown), or the like. A similar assembly, appropriately adjusted in size, shape or the like, may likewise be utilized in heater cores (not shown). In each of these cases, the sacrificial anode 13 according to this embodiment is preferably disposed in the inlet hose connection of the radiator or heater core. Thus, this arrangement may be particularly useful as a "drop in" for aftermarket—i.e., for radiators and heater cores that are already produced or in service in vehicles already on the road.

Figure 1B:
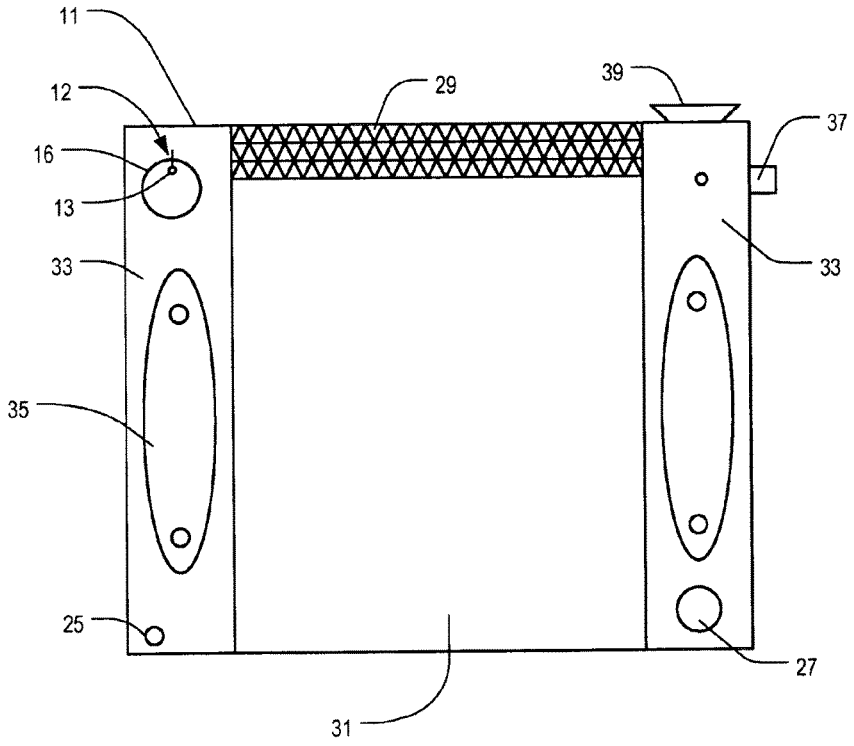
FIG. 1B is a front schematic view of a crossflow radiator having an electrolysis prevention device arranged as shown in FIG. 1A.
Figure 1C:
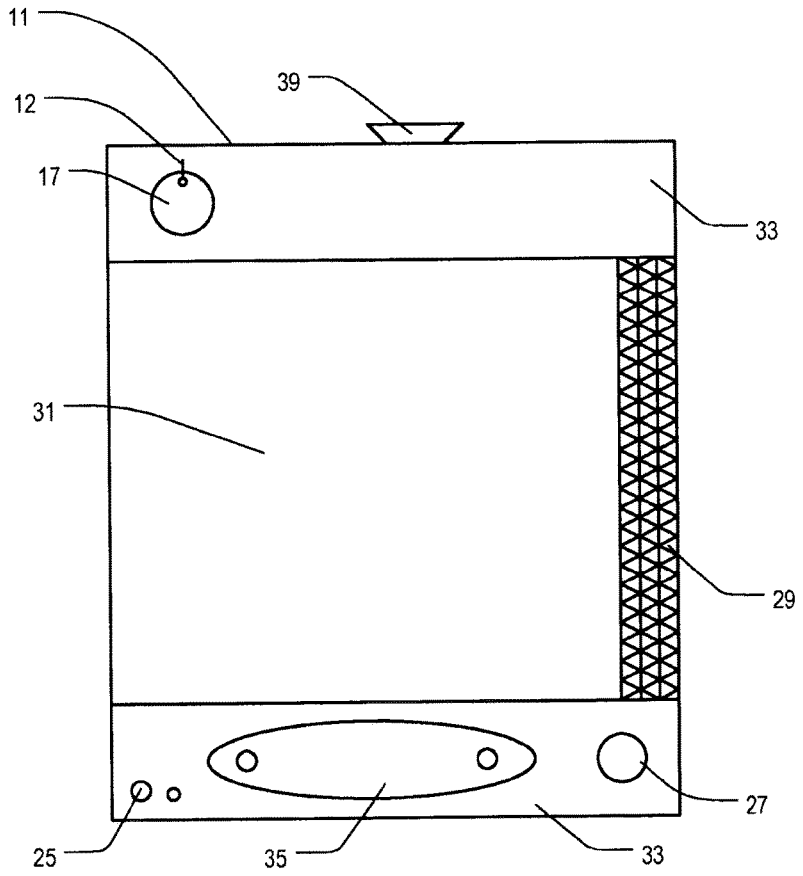
FIG. 1C is a front schematic view of a downflow radiator having an electrolysis prevention device arranged as shown in FIG. 1A.

FIG. 1B is a front schematic view of a crossflow radiator 11 having an electrolysis prevention device arranged as shown in FIG. 1A, while FIG. 1C is a front schematic view of a downflow radiator 11 having an electrolysis prevention device 12 arranged as shown in FIG. 1A. A typical radiator includes an aluminum core 31 and either plastic or all-aluminum tanks 33. The specific inlet connection 16 varies by vehicle make, model and model year, but the inlet 17 is generally understood to refer to the vicinity of where hot water coming directly from the engine enters into the radiator 11. The radiator 11 may include a fill cap 39 as shown in FIG. 1C but is understood to be optional and is not present on many radiators 39. Further, at least some radiators have a coolant reservoir.

Both downflow and crossflow radiators typically have a pedcock 25 for draining fluid from the radiator, an outlet 27, core fins and tubes 29, and may optionally have a transmission and engine oil cooler/heater connection 35 and temperature sensor 37.

Figure 2A:
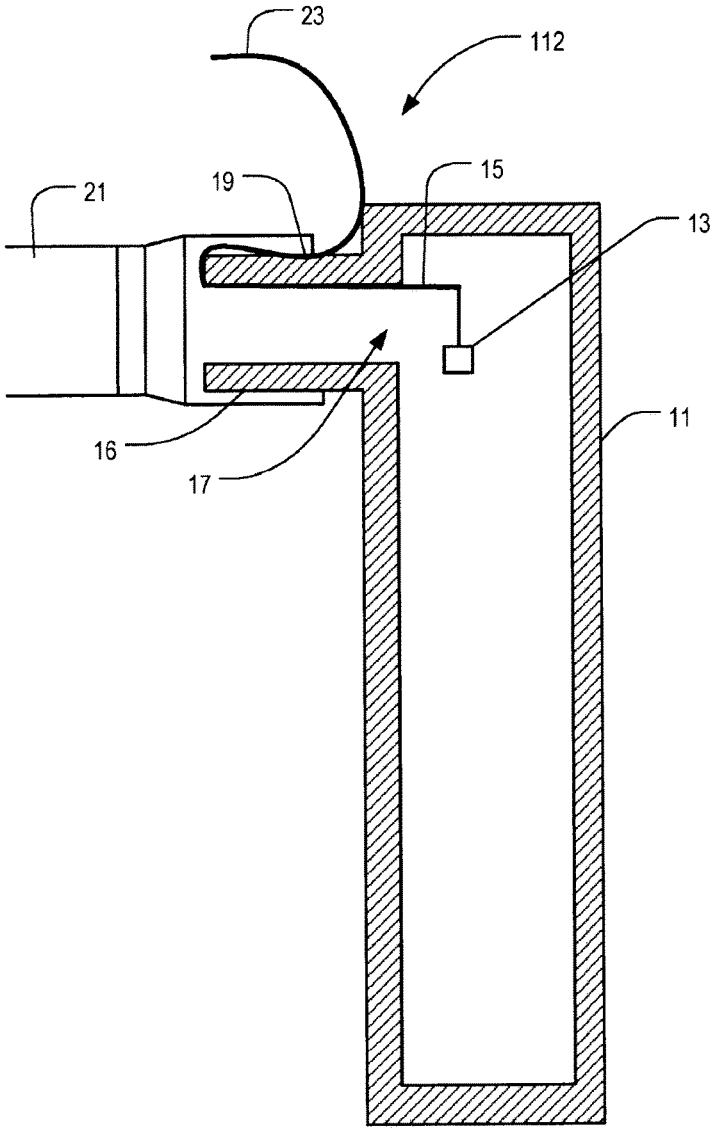
FIG. 2A is a left side cross-sectional view of a radiator having an electrolysis prevention device in accordance with a second preferred embodiment of the present invention.
Figure 2B:
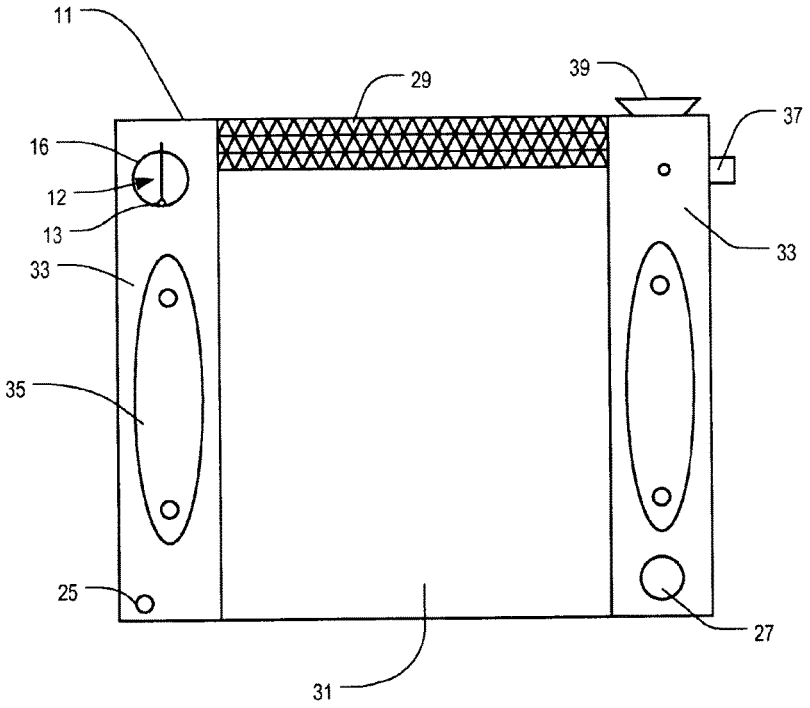
FIG. 2B is a front schematic view of a crossflow radiator having an electrolysis prevention device arranged as shown in FIG. 2A.
Figure 2C:
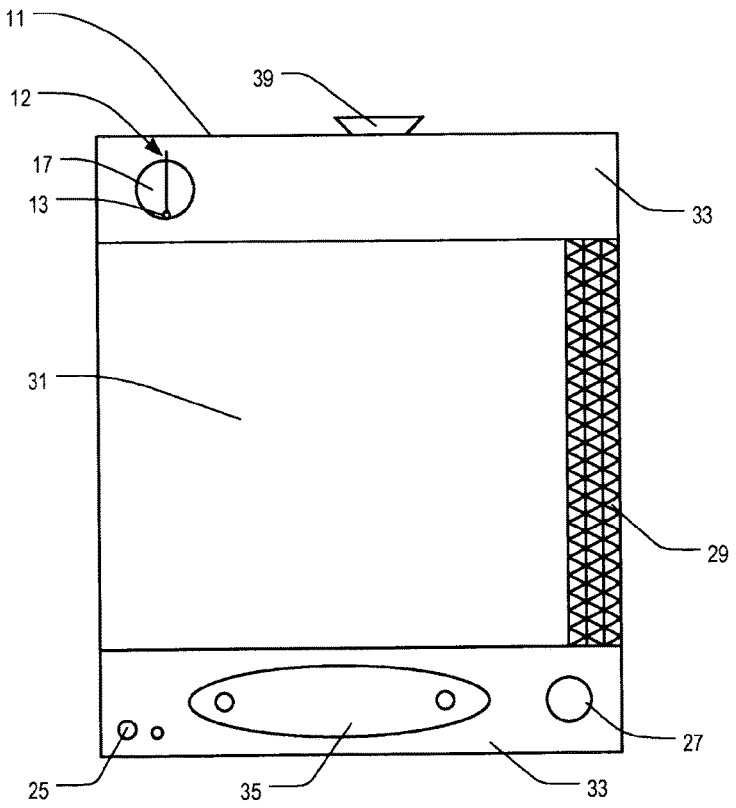
FIG. 2C is a front schematic view of a downflow radiator having an electrolysis prevention device arranged as shown in FIG. 2A.

FIG. 2A is a left side cross-sectional view of a radiator 11 having an electrolysis prevention device 112 in accordance with a second preferred embodiment of the present invention. The electrolysis prevention device 112 in this embodiment is generally similar to that of FIG. 1A, but the anode 13 itself hangs further down below the center axis of the radiator inlet 17 so as to be placed slightly lower into the flow of the water, coolant, or antifreeze. FIG. 2B is a front schematic view of a crossflow radiator 11 having an electrolysis prevention device 112 arranged as shown in FIG. 2A; and FIG. 2C is a front schematic view of a downflow radiator 11 having an electrolysis prevention device 112 arranged as shown in FIG. 2A. As with previous embodiments, the device 112 optionally may or may not be connected via ground wire to the wiring harness, a suitable grounded location on the frame or cross member of the vehicle, or the like.

Figure 3A:
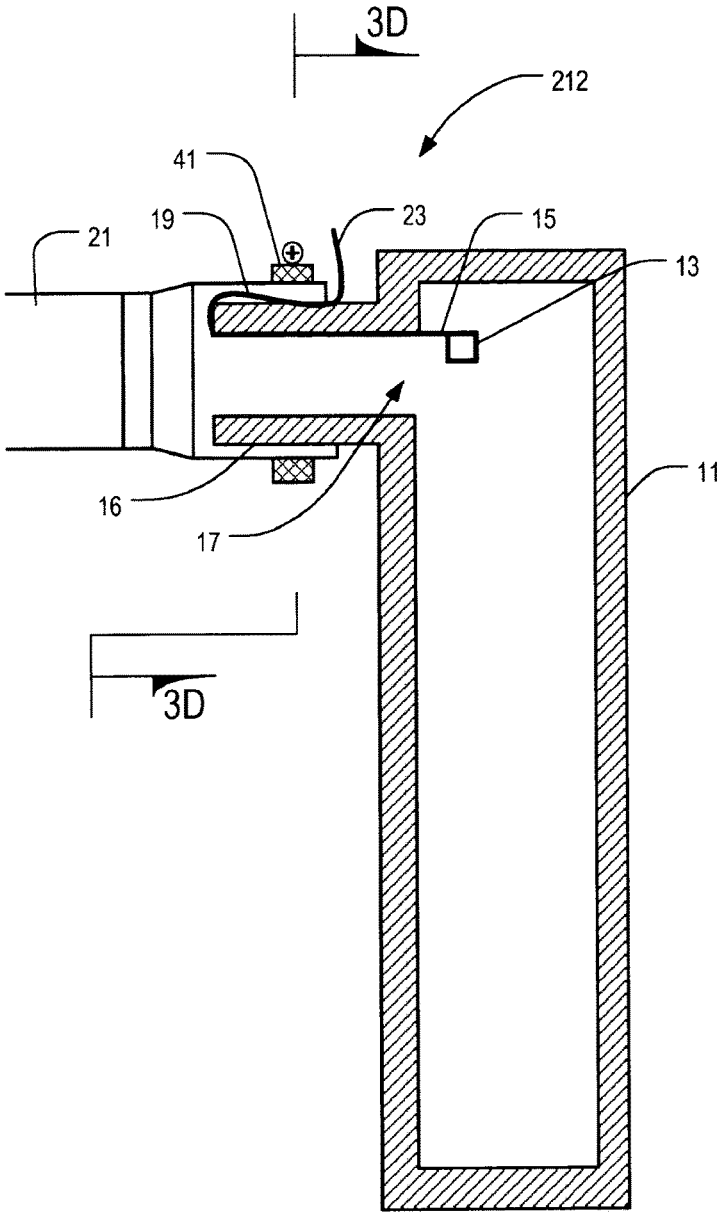
FIG. 3A is a left side cross-sectional view of a radiator having an electrolysis prevention device in accordance with a third preferred embodiment of the present invention.
Figure 3B:
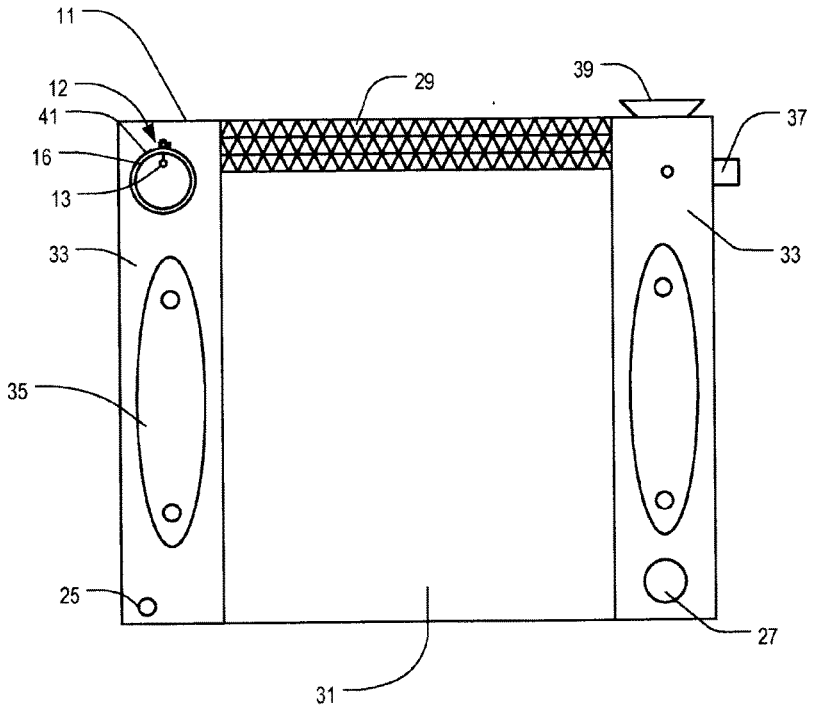
FIG. 3B is a front schematic view of a crossflow radiator having an electrolysis prevention device arranged as shown in FIG. 3A.
Figure 3C:
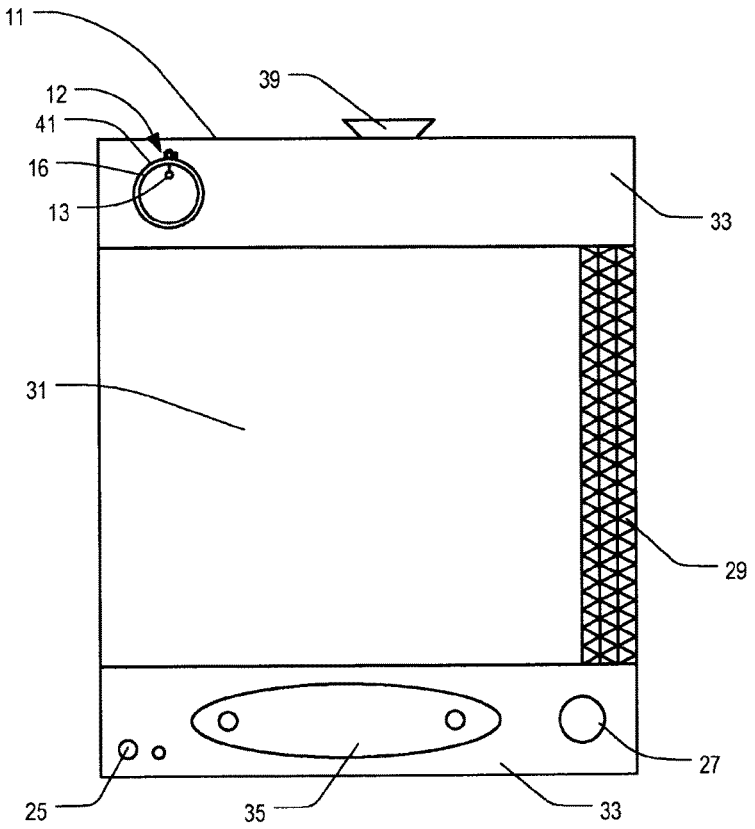
FIG. 3C is a front schematic view of a downflow radiator having an electrolysis prevention device arranged as shown in FIG. 3A.
Figure 3D:
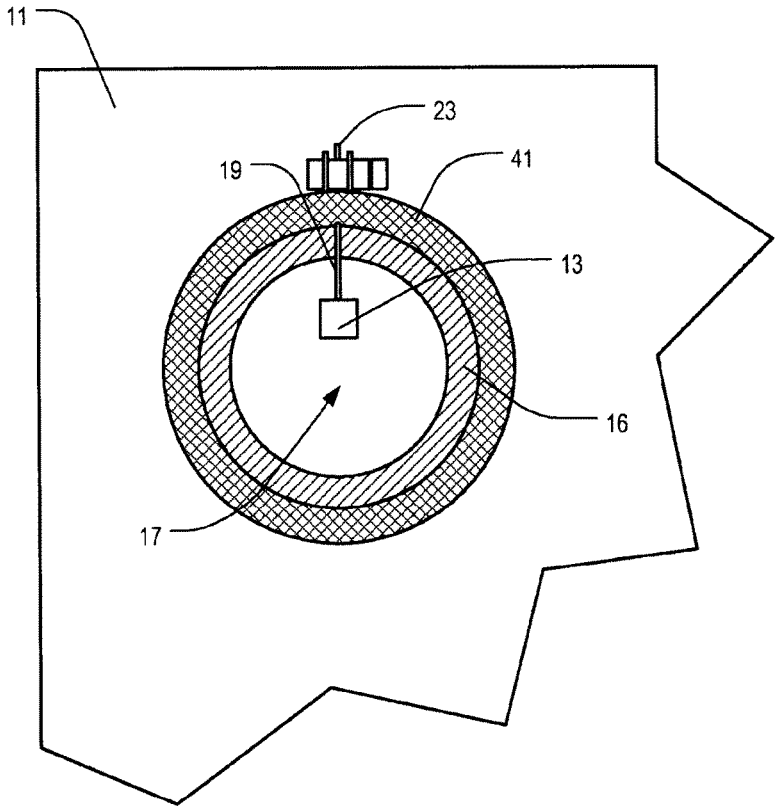
FIG. 3D is a front cross-sectional view of the inlet connection of FIG. 3A, taken along line 3D-3D and focusing on the inlet and inlet connection.

FIG. 3A is a left side cross-sectional view of a radiator 11 having an electrolysis prevention device 212 in accordance with a third preferred embodiment of the present invention; FIG. 3B is a front schematic view of a crossflow radiator 11 having a sacrificial anode arranged as shown in FIG. 3A; and FIG. 3C is a front schematic view of a downflow radiator 11 having an electrolysis prevention device 212 arranged as shown in FIG. 3A. FIG. 3D is a front cross-sectional view of the inlet connection of FIG. 3A, taken along line 3D-3D and focusing on the inlet 17 and inlet connection 16. In this preferred embodiment, the sacrificial anode 13 and support 19 are held in place with a clamp 41. As with previous embodiments, the device 212 optionally may or may not be connected via ground wire to the wiring harness, a suitable grounded location on the frame or cross member of the vehicle, or the like.

Figure 4A:
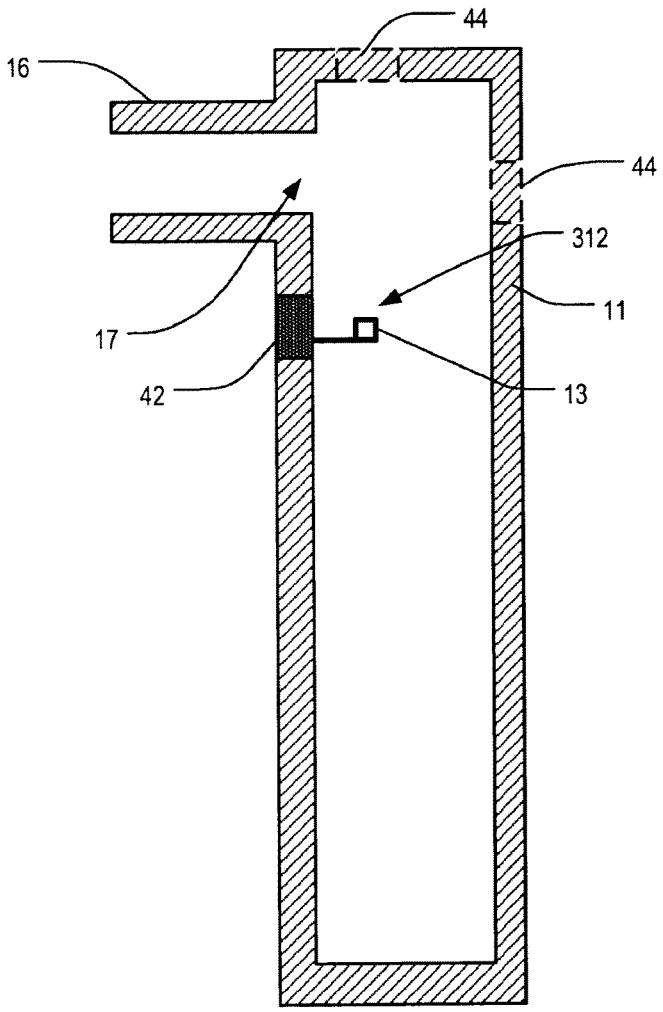
FIG. 4A is a left side cross-sectional view of a radiator having an electrolysis prevention device in accordance with a fourth preferred embodiment of the present invention.
Figure 4B:
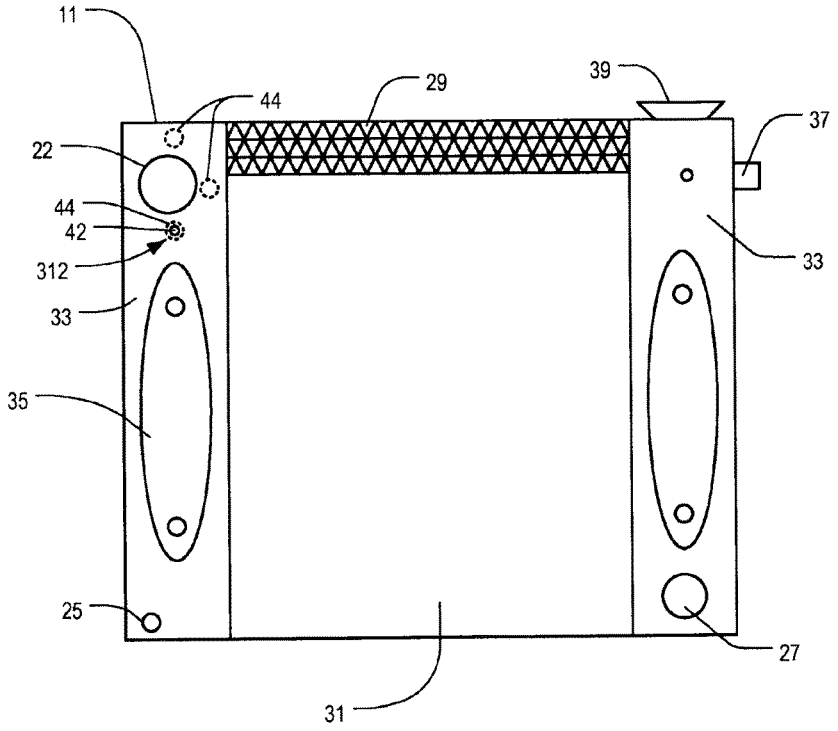
FIG. 4B is a front schematic view of a crossflow radiator having an electrolysis prevention device arranged as shown in FIG. 4A.
Figure 4C:
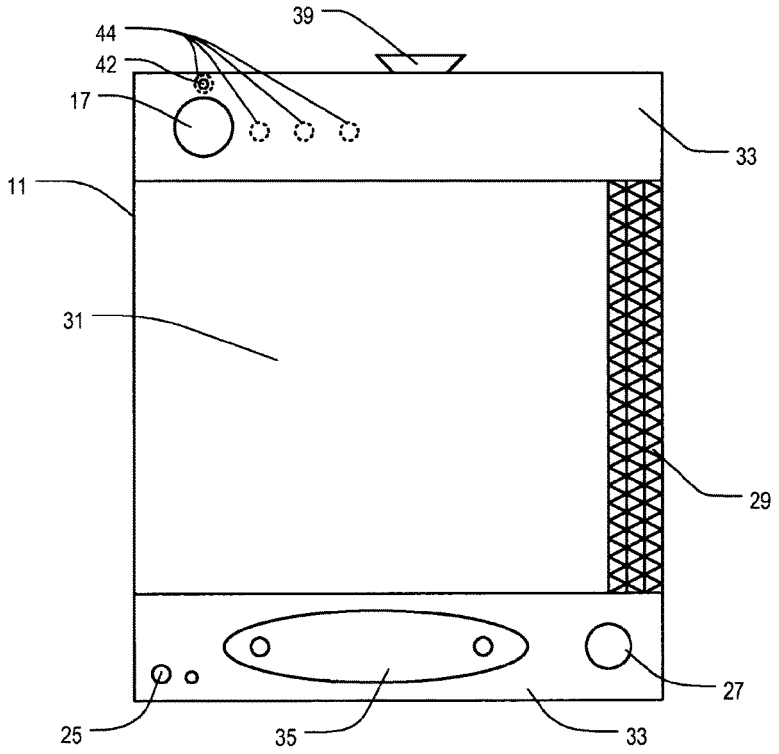
FIG. 4C is a front schematic view of a downflow radiator having an electrolysis prevention device arranged as shown in FIG. 4A.

FIG. 4A is a left side cross-sectional view of a radiator having an electrolysis prevention device 312 in accordance with a fourth preferred embodiment of the present invention; FIG. 4B is a front schematic view of a crossflow radiator having an electrolysis prevention device arranged as shown in FIG. 4A; and FIG. 4C is a front schematic view of a downflow radiator having an electrolysis prevention device arranged as shown in FIG. 4A. In this embodiment, the electrolysis prevention device 312 is built into the radiator 11 when the radiator 11 is manufactured. The device 12 may be attached to the interior of the radiator 11 at any of a variety of locations 44 in the vicinity of the inlet 17. In particular, this allows for an anode 13 to be attached by any way imaginable within 10 inches in any direction of the center axis of the inlet connection 16. Preferably, attachment is to the aluminum tank 33 or the aluminum core 31 via weld 42, but other attachment means and connection points may alternatively be used. As with previous embodiments, the device 312 optionally may or may not be connected via ground wire to the wiring harness, a suitable grounded location on the frame or cross member of the vehicle, or the like.

Figure 5A:
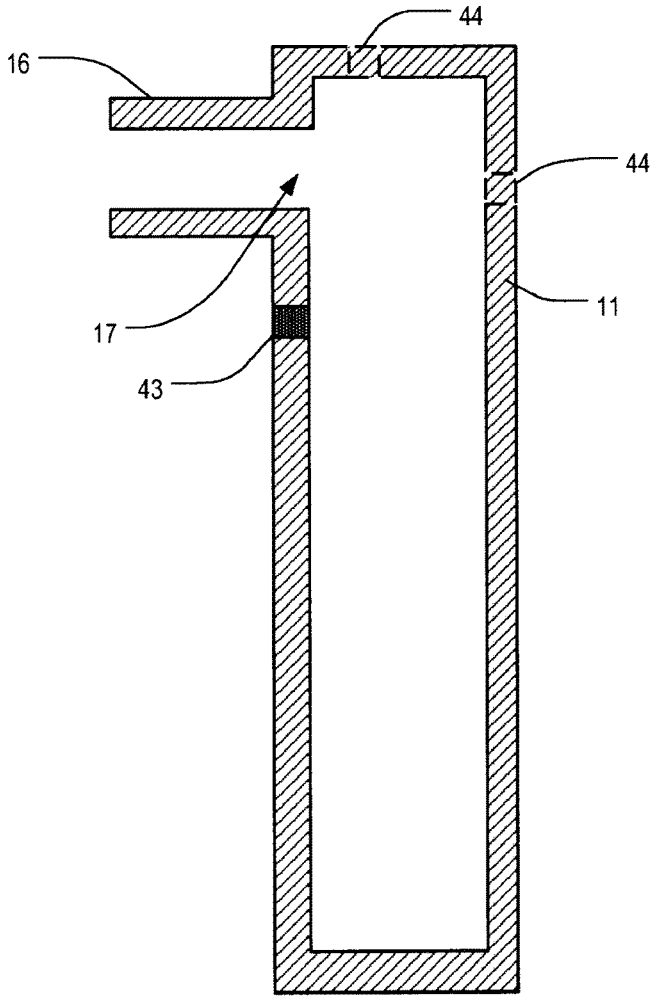
FIG. 5A is a left side cross-sectional view of a radiator illustrating various locations for a removable plug that may be replaced with an electrolysis prevention device in accordance with a sixth preferred embodiment of the present invention.
Figure 5B:
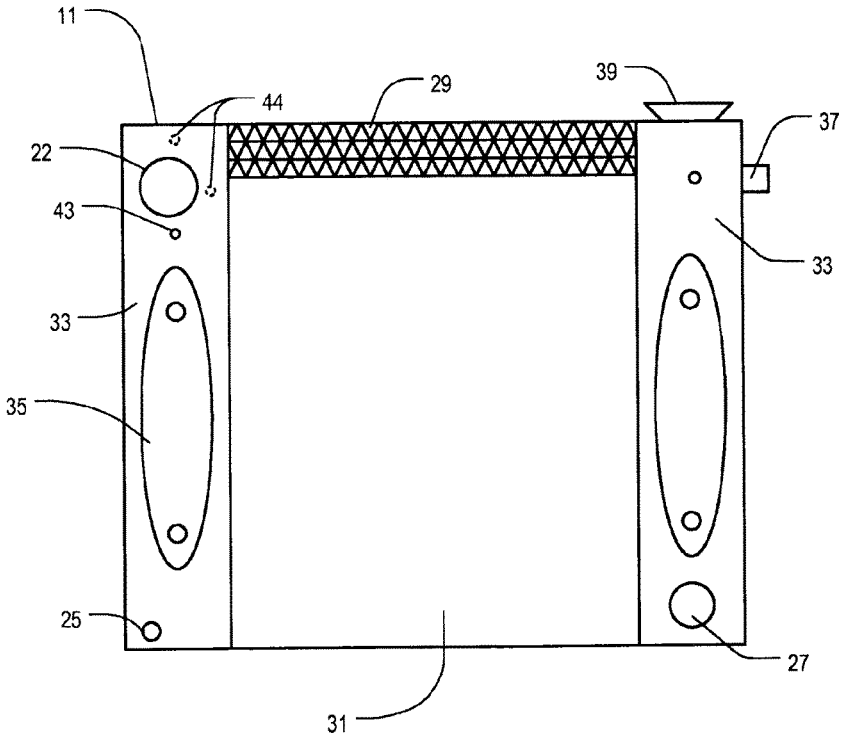
FIG. 5B is a front schematic view of a crossflow radiator illustrating various locations for a removable plug that may be replaced with an electrolysis prevention device.
Figure 5C:
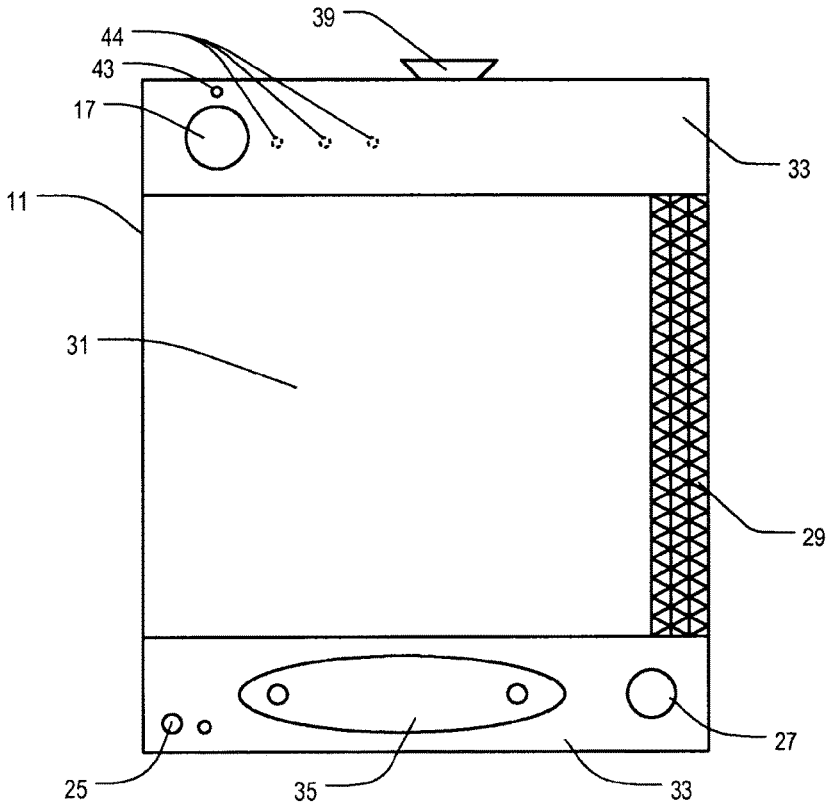
FIG. 5C is a front schematic view of a downflow radiator illustrating various locations for a removable plug that may be replaced with an electrolysis prevention device.
Figure 6A:
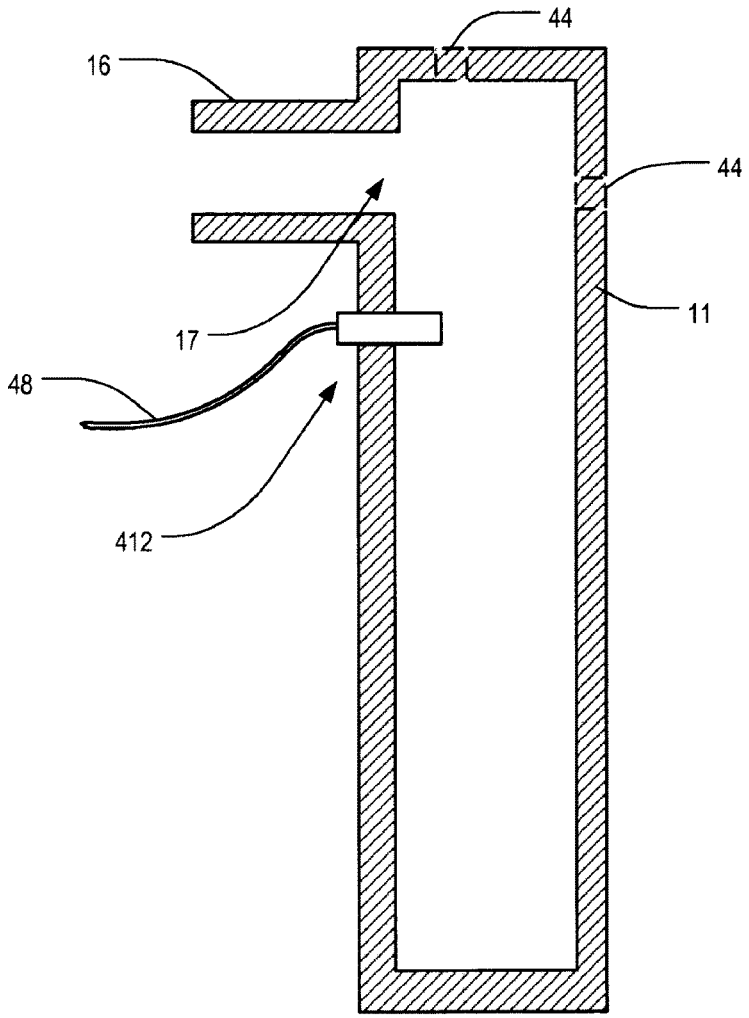
FIG. 6A is a left side cross-sectional view of the radiator of FIG. 5A, shown with an electrolysis prevention device installed in place of the removable plug.
Figure 6B:
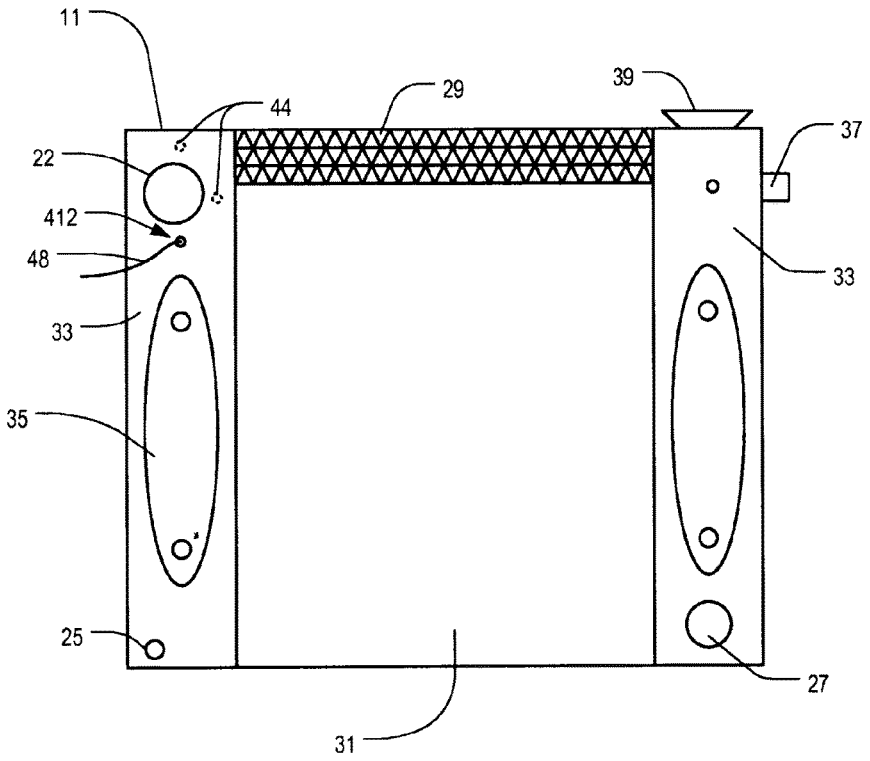
FIG. 6B is a front schematic view of the crossflow radiator of FIG. 5B, shown with an electrolysis prevention device installed in place of the removable plug.

FIG. 5A is a left side cross-sectional view of a radiator illustrating various locations for a removable plug 43 that may be replaced with an electrolysis prevention device 412 in accordance with a fifth preferred embodiment of the present invention; FIG. 5B is a front schematic view of a crossflow radiator illustrating various locations for a removable plug 43 that may be replaced with an electrolysis prevention device; and FIG. 5C is a front schematic view of a downflow radiator illustrating various locations for a removable plug 43 that may be replaced with an electrolysis prevention device 412. In at least one preferred embodiment, the removable plug may be a threaded pipe plug with a ⅜ pipe thread. It will be appreciated that although one plug 43 is illustrated, there are other locations 44 where the plug 43 can alternatively be installed. Regardless of where the plug 43 is located, it is installed at time of manufacture (or optionally replaced during a subsequent repair procedure) but can be removed and replaced with an electrolysis prevention device such as one of the devices 412,512 shown in FIGS. 7A-7C. In this regard, FIG. 6A is a left side cross-sectional view of the radiator of FIG. 5A, shown with an electrolysis prevention device 412 installed in place of the removable plug 43; FIG. 6B is a front schematic view of the crossflow radiator of FIG. 5B, shown with an electrolysis prevention device 412 installed in place of the removable plug 43; and FIG. 6C is a front schematic view of the downflow radiator of FIG. 5C, shown with an electrolysis prevention device 412 installed in place of the removable plug 43.

Notably, in some embodiments, the radiator manufacturer provides the hole and the plug 43 for the hole, and the electrolysis prevention device 412 is installed by a mechanic in an after-market process, while in other embodiments, the radiator manufacturer installs the electrolysis prevention device 412 at time of manufacture.

Figure 6C:
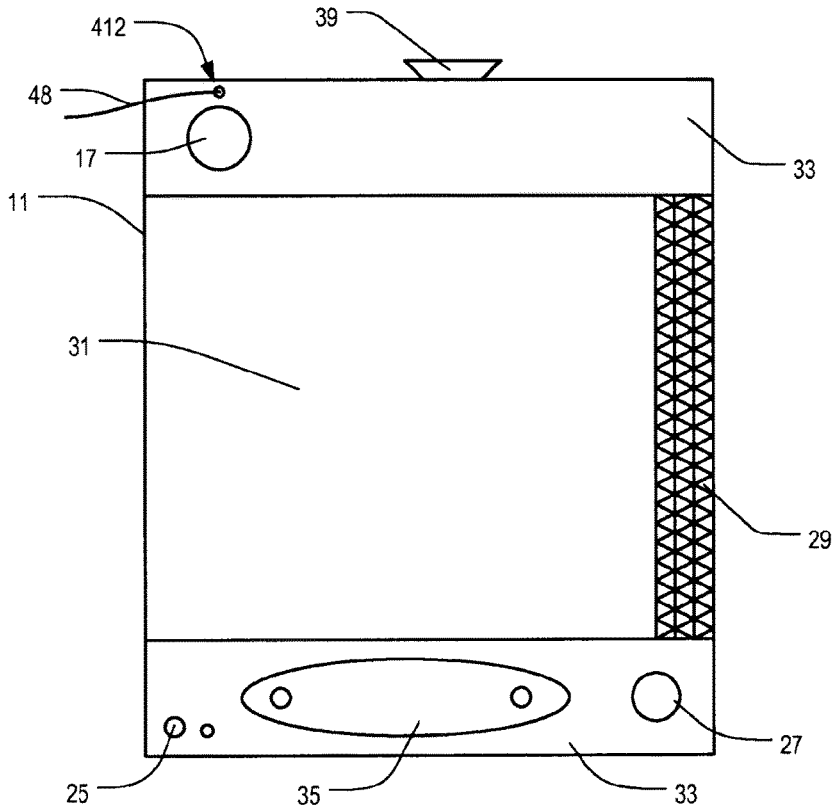
FIG. 6C is a front schematic view of the downflow radiator of FIG. 5C, shown with an electrolysis prevention device installed in place of the removable plug.
Figure 7A:
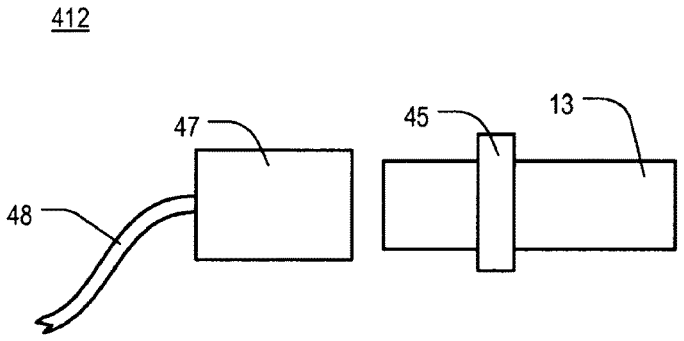
FIG. 7A is a side view of an electrolysis prevention device for use in the radiators of FIGS. 5A-5C.
Figure 7B:
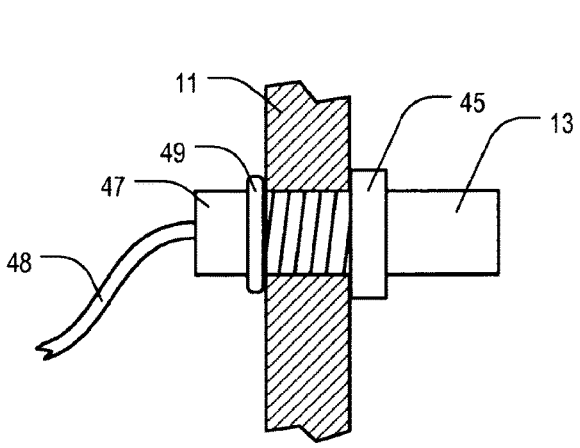
FIG. 7B is a side view of the electrolysis prevention device of FIG. 7A.
Figure 7C:
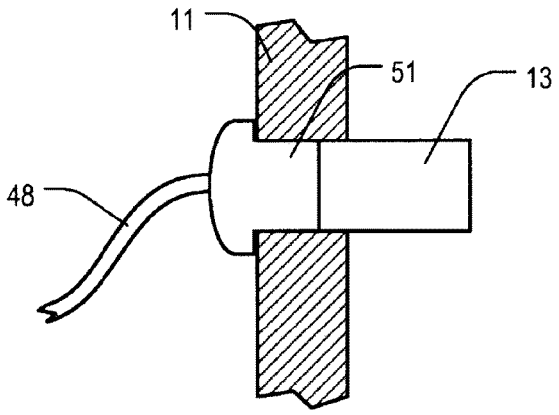
FIG. 7C is a side view of another electrolysis prevention device for use in the radiators of FIGS. 5A-5C.

FIG. 7A is a side view of the electrolysis prevention device 412 of FIGS. 6A-6C, comprising the sacrificial anode 13 and an anode holder 45 with a "pigtail" connector 47 into which the anode attaches. The "pigtail" connector 47 grounds the device 12 by attaching it to the vehicle's wiring harness, a suitable grounded location on the frame or cross member of the vehicle, or the like, via grounding wire 48. As with previous embodiments, however, the device 412 optionally may or may not be grounded in this manner. FIG. 7B is a side view of an electrolysis prevention device shown in FIG. 7A wherein the anode 13 is attached into the anode holder 45 inserted in a hole in the wall of the radiator 11. An o-ring 49 is also installed to protect against leaking FIG. 7C is a side view of another electrolysis prevention device 512 for use in the radiators 11 of FIGS. 5A-5C, wherein a rubber seal 51 is utilized to hold the anode 13 in place in the hole of the radiator 11.

Figure 11A:
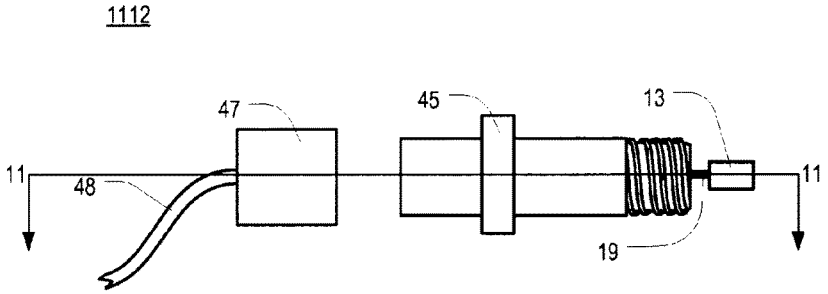
FIG. 11A is a side view of an electrolysis prevention device for use in the radiators of FIGS. 5A-5C.
Figure 11B:
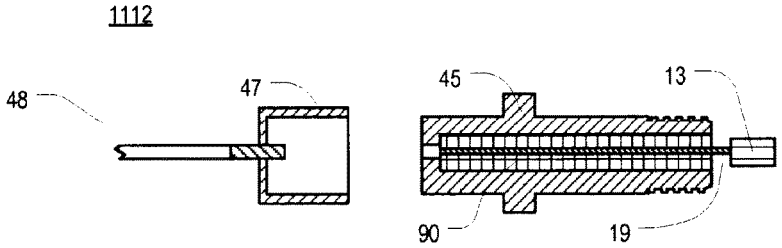
FIG. 11B is a top cross-sectional view of the electrolysis prevention device of FIG. 11A, taken along line 11-11.
Figure 11C:
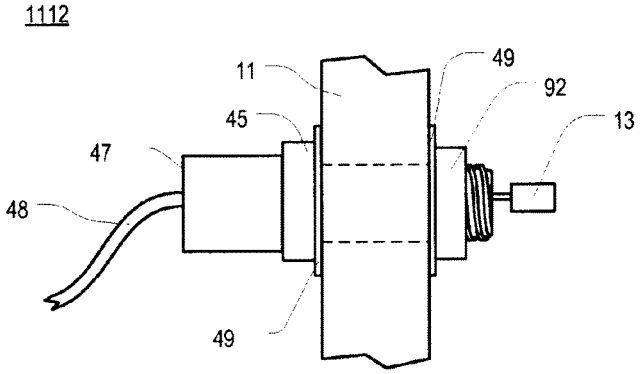
FIG. 11C is a side schematic view of the electrolysis prevention device of FIG. 11A, shown installed in a radiator.

FIGS. 11A-11C illustrate an alternative electrolysis prevention device 1112 for use in radiators 11 of FIGS. 5A-5C. FIG. 11A is a side view of the electrolysis prevention device 1112, comprising a sacrificial anode 13 and an partially threaded anode holder 45 with a "pigtail" connector 47 into which the anode attaches. The sacrificial anode 13 is affixed to an anode support 19 which extends from one end of the anode holder 45. The "pigtail" connector 47 grounds the device 1112 by attaching it to the vehicle's wiring harness, a suitable grounded location on the frame, or cross member of the vehicle, or the like, via grounding wire 48. As with previous embodiments, however, the device 1112 optionally may or may not be grounded in this manner.

FIG. 11B is a cross-sectional view of the electrolysis prevention device 1112 shown in FIG. 11A. As shown therein, the anode support 19 extends through the interior of the anode holder 45, and is separated from the holder 45 by an insulating material 90. Furthermore, in at least one preferred embodiment, the anode holder 45 has a small opening into which the ground wire 48 can extend, and thus be in electrical connection with the anode support 19, grounding the device 1112.

FIG. 11C is a side view of the electrolysis prevention device 1112 of FIGS. 11A-11B, wherein the device 1112 has been installed in a hole in a wall of a radiator 11. An o-ring 49 is also installed on each side to seal the opening, thereby protecting against leakage. It will be appreciated that the dashed lines in FIG. 11C illustrate where the anode holder passes through the radiator wall. The device 1112 is secured to the wall of the radiator 11 with a threaded nut 92 that has been screwed into the threaded end of the anode holder 45 such that the radiator wall is clamped between the threaded nut 92 and a flange on the anode holder 45.

Figure 8A:
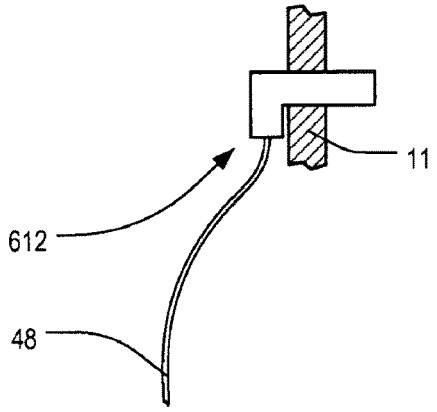
FIG. 8A is a side schematic view of an electrolysis prevention device arranged at a 90-degree angle for easy access.
Figure 8B:
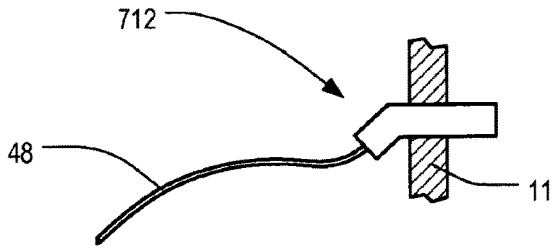
FIG. 8B is a side schematic view of an electrolysis prevention device arranged at a 45-degree angle for easy access.

FIGS. 8A and 8B are side schematic views of two electrolysis prevention devices arranged at different angles to promote easy access. The first drawing depicts an electrolysis prevention device 612 arranged at a 90-degree angle. The second depiction is of an electrolysis prevention device 712 arranged at a 45-degree angle.

Figure 9A:
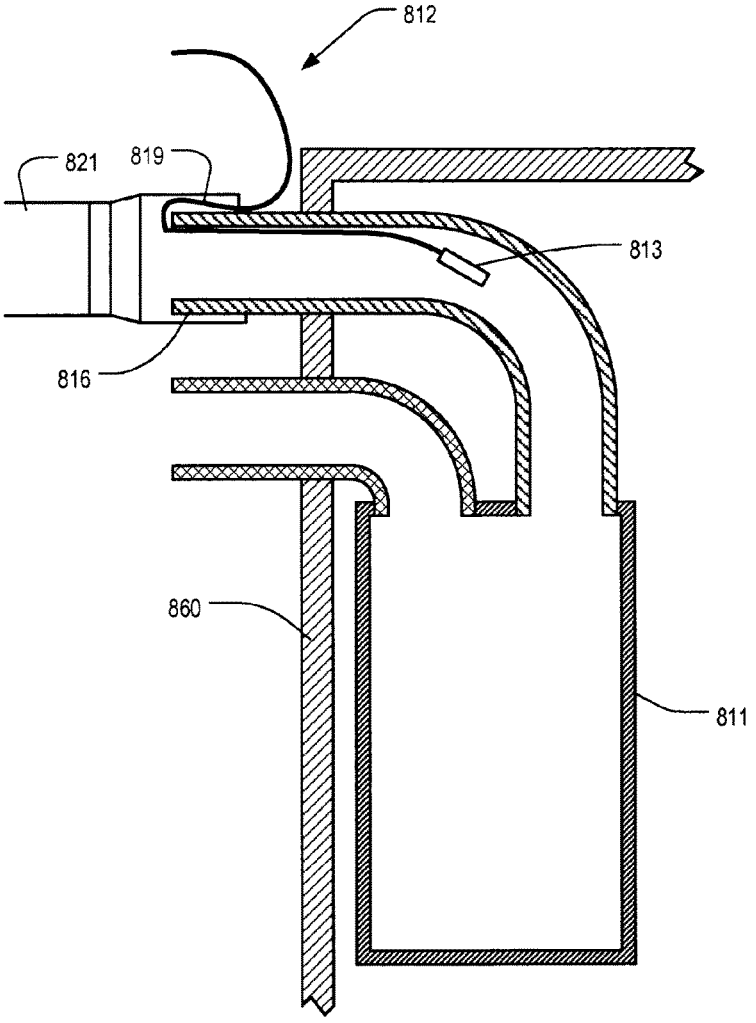
FIG. 9A is a side schematic of a heater core having an electrolysis prevention device in accordance with a sixth preferred embodiment of the present invention.

It will be appreciated that the various teachings described and illustrated herein may likewise be applied to protect a heater core from corrosion in a similar fashion. In this regard, it will be further appreciated that, because of their generally smaller size, heater cores may require the use of a sacrificial anode of different dimensions, and in particular may require the use of a thinner or slimmer anode and, in at least some cases, produce a correspondingly slimmer electrolysis prevention device. The change in dimension may be necessary to prevent damage to the heater core when mounted therein. FIG. 9A is a side schematic of a heater core 811 having an electrolysis prevention device 812 in accordance with a sixth preferred embodiment of the present invention. The heater core 811 is typically located near the firewall 860, with an inlet pipe 816 to which an inlet hose 821 is attached. An outlet hose (not shown) is likewise provided. The heater core 811 may be constructed of aluminum with aluminum tanks or plastic tanks The sacrificial anode 813 can be clipped in, welded on, clamped on, or fastened by any method to protect against corrosion. The anode support 819 can be constructed from any metal, plastic, or other material that is capable of securing a sacrificial anode and attaching to the inlet pipe 816 of the heater core 811. The sacrificial anode 813 that is enclosed within the device is allowed to be dropped into the radiator heater core 811. This device "shortens" the inlet radiator hose and/or heater inlet hose in efforts to replicate all of the before mentioned electrolysis prevention devices in any form. As with previous embodiments, the device 812 optionally may or may not be connected via ground wire to the wiring harness, a suitable grounded location on the frame or cross member of the vehicle, or the like.

Figure 9B:
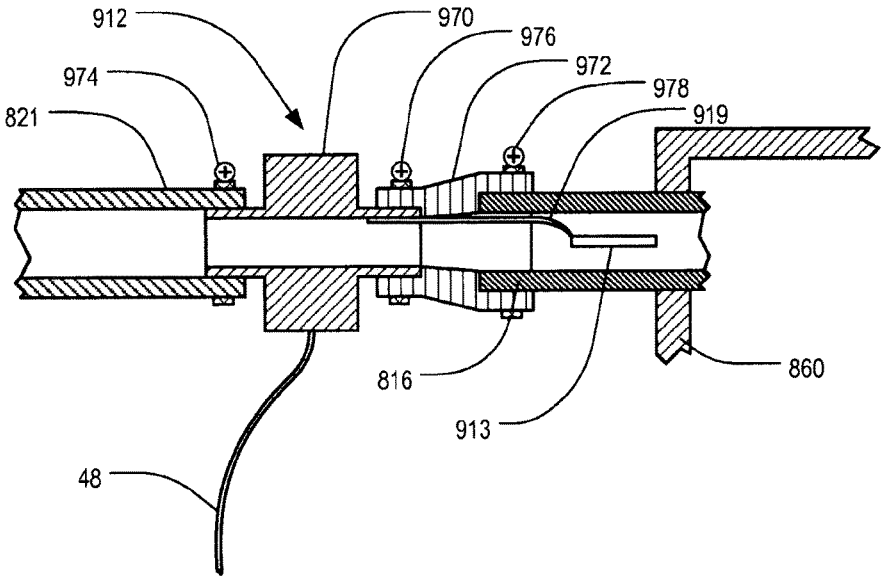
FIG. 9B is an enlarged view of a portion of the inlet hose and inlet pipe of the heater core of FIG. 9A but with an alternative electrolysis prevention device installed therein in accordance with a seventh preferred embodiment of the present invention.

FIG. 9B is an enlarged view of a portion of the inlet hose 821 and inlet pipe 816 of the heater core 811 of FIG. 9A but with an alternative electrolysis prevention device 912 installed therein in accordance with a seventh preferred embodiment of the present invention. The device 912 includes a short pipe insert 970 connected to the inlet hose 821 and to which one end of an anode holder 919 is attached. A sacrificial anode 913 is disposed at the opposite end of the anode holder 919. The pipe insert 970 is connected to the inlet pipe 816 via a short rubber sleeve 972. Clamps 974, 976,978 are used to connect the hose 821 to the pipe insert 970 and the sleeve 972 to the pipe insert 970 and to the inlet pipe 816. This device "shortens" the inlet radiator hose and/or heater inlet hose in efforts to replicate all of the before mentioned sacrificial anodes in any form. It will be appreciated that a similar device may be utilized with radiators 11. As with previous embodiments, the device 912 optionally may or may not be connected via ground wire to the wiring harness, a suitable grounded location on the frame or cross member of the vehicle, or the like.

Figure 10A:
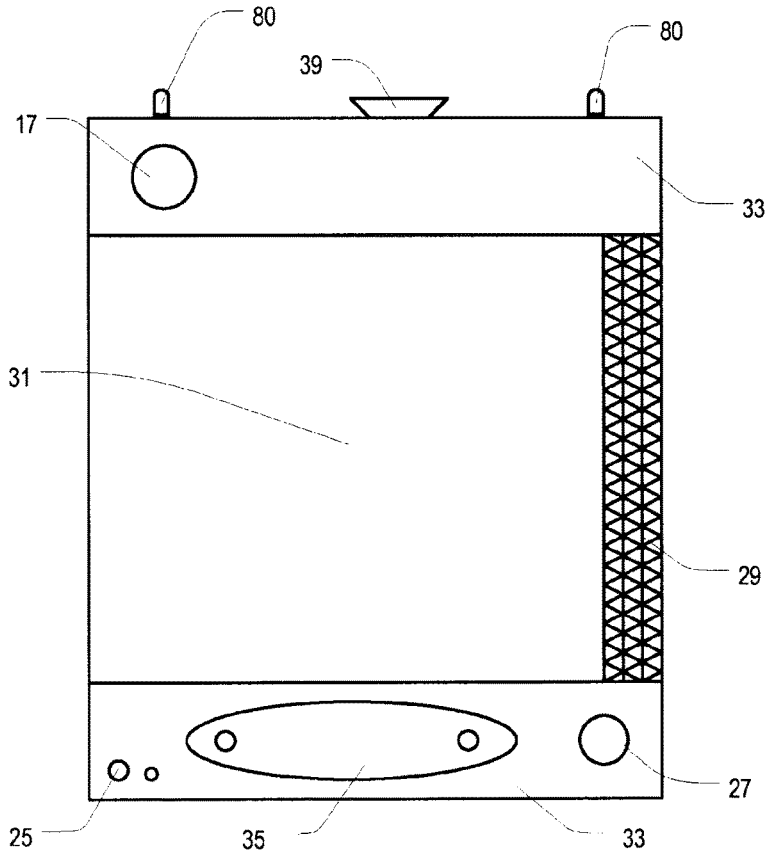
FIG. 10A is a front schematic view of a downflow radiator having an electrolysis prevention shield in accordance with a seventh preferred embodiment of the present invention.
Figure 10B:
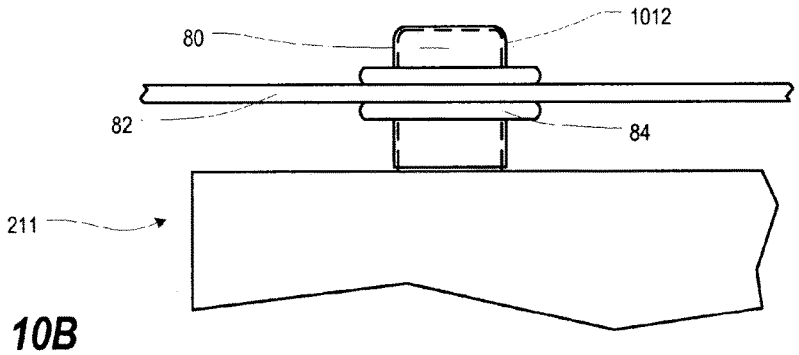
FIG. 10B is an enlarged fragmentary front schematic view of a portion of the radiator of FIG. 10A, detailing a mounting peg covered by the electrolysis prevention shield.
Figure 10C:
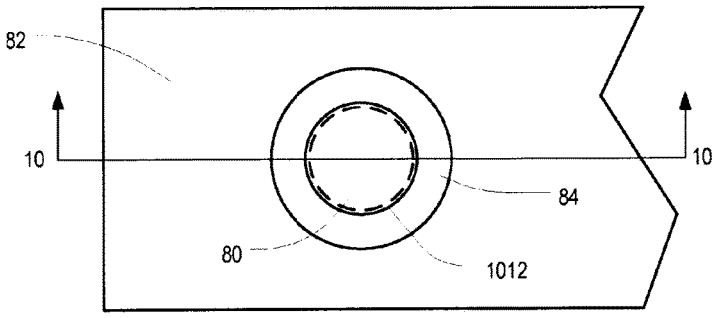
FIG. 10C is an enlarged fragmentary top schematic view of the portion of the radiator of FIG. 10A.
Figure 10D:
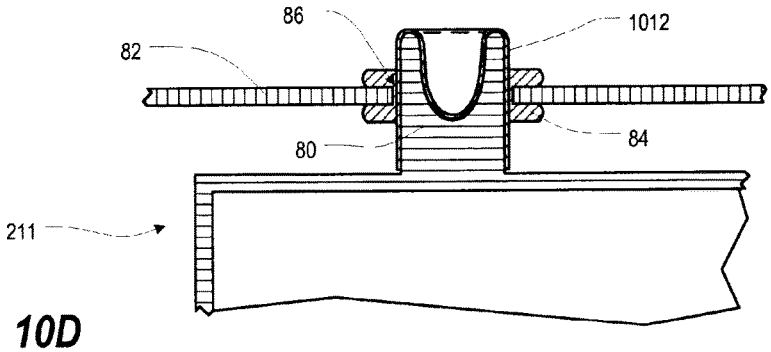
FIG. 10D is a front cross-sectional view of the portion of the radiator shown in FIG. 10C, taken along line 10-10.

FIGS. 10A-10D illustrate a radiator 211 having an electrolysis prevention shield 1012 in accordance with an eighth preferred embodiment of the present invention. FIG. 10A is a front schematic view of a downflow aluminum radiator 211 with two vertically extending, metal mounting pegs 80, each of which is covered by an electrolysis prevention shield 1012. FIG. 10B is an enlarged fragmentary front schematic view of a portion of the radiator 211 of FIG. 10A showing the radiator 211 secured to a vehicle frame 82 via the mounting peg 80. FIG. 10C is an enlarged fragmentary top view of the portion of the radiator 211 of FIG. 10B, further illustrating the radiator 211 secured to the vehicle frame 82. FIG. 10D is a front cross-sectional view of the portion of the radiator 211 of FIGS. 10B and 10C taken along line 10-10. The electrolysis prevention shield 1012 comprises a sheathing of durable insulating material, such as rubber or plastic, that can be molded or otherwise affixed to a metal component of a radiator or heater core that is electrically exposed to metal components in the vehicle. The insulating material of the electrolysis prevention device 1012 acts as a barrier to prevent metal-on-metal contact which leads to electrolysis and eventually corrosion of portions of a radiator, thereby causing leaks. In at least one preferred embodiment, the device 1012 is comprised of insulating material, such as polyolefin or other "shrink wrap" polymers, that shrinks tightly over whatever it is covering when heat is applied.

As shown in FIGS. 10B-10D, the mounting peg 80 secures the radiator 211 to an appropriate vehicle frame 82 by extending through a circular opening 86 in the frame 82 that is slightly larger than the diameter of the mounting peg 80. In order to insulate the radiator 211 from vibration and other effects, the interface between the mounting peg 80 and the opening 86 is conventionally sealed with an o-ring 84. However, it is believed that small electrical currents may continue to flow between the metal material of the frame 82 and the metal material of the mounting pegs 80, and that such currents contribute the electrolysis problems described elsewhere herein. The electrolysis prevention shield 1012 shown herein aids in preventing this by completely surrounding the mounting peg 80, shielding the mounting peg 80 from direct contact with both the o-ring 84 and the vehicle frame 82 and otherwise preventing current flow between the elements 80,82. The electrolysis prevention shield 1012 is perhaps best utilized with one or more of the various electrolysis prevention devices described elsewhere. In this regard, it will be appreciated that the broken lines of FIGS. 10B-10D illustrate the portion of the mounting peg 80 that may be hidden beneath the electrolysis prevention shield 1012, and that FIG. 10D shows a cross-section of the electrolysis prevention shield 1012 "shrink-wrapped" or otherwise molded or assembled to tightly fit the shape and contour of the mounting peg 80. The tight fit afforded thereby prevents the shield 1012 from becoming separated or disconnected from the mounting peg 80 and thus provides better protection against any direct metal-on-metal contact.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. An electrolysis prevention device, for preventing corrosion caused by electrolysis, comprising:

a sacrificial anode made of an active metal; and an anode holder supporting the sacrificial anode;

wherein the holder is adapted to fit around the inlet connection of an engine heat exchange component in such a way as to allow for a hose to be attached overtop the device.

2. The electrolysis prevention device of claim 1 wherein the sacrificial anode is made of aluminum.

3. The electrolysis prevention device of claim 1 wherein the sacrificial anode is made of magnesium.

4. The electrolysis prevention device of claim 1 wherein the sacrificial anode is made of zinc.

5. The electrolysis prevention device of claim 1 wherein the anode holder is grounded to a vehicle.

6. The electrolysis prevention device of claim 1 wherein an end of the anode holder is attached to an additional wire positioning the sacrificial anode further down into the flow of liquid coolant within the engine heat exchange component.

7. The electrolysis prevention device of claim 1 wherein the anode holder is connected to the engine heat exchange component by a clamp.

8. The electrolysis prevention device of claim 1 wherein the engine heat exchange component is a radiator.

9. The electrolysis prevention device of claim 1 wherein the engine heat exchange component is a heater core.

10. A radiator with the electrolysis prevention device of claim 1 in proximity to an inlet connection thereof.

11. A heater core with the electrolysis prevention device of claim 1 in proximity to an inlet connection thereof.

12. A method of preventing corrosion of [an engine heat exchange component] *a radiator, the method* comprising [adding or]*:* installing a sacrificial anode assembly *including a sacrificial anode* within the [heat exchange component adjacent an inlet thereof] *radiator, wherein the sacrificial anode is placed within 10 inches of a hot liquid inlet to the radiator*.

13. An electrolysis prevention device, for preventing corrosion caused by electrolysis, comprising:

a sacrificial anode made of an active metal; and an anode holder supporting the sacrificial anode;

wherein the holder is adapted to fit through and around the inlet connection of an engine heat exchange component in such a way as to allow for a hose to be attached to and around the inlet connection without dislodging the holder.

14. A engine heat exchange component with the electrolysis prevention device of claim 13 installed such that the holder of the device extends through, and is doubled back around, the inlet connection and the sacrificial anode is disposed in proximity to the inlet connection.

*15. The method of claim 12, wherein the sacrificial anode consists essentially of an active metal.*

*16. The method of claim 15, wherein the sacrificial anode consists essentially of aluminum, magnesium, or zinc.*

*17. The method of claim 12, wherein installing the sacrificial anode assembly further comprises: installing the sacrificial anode assembly in a fitting hole in the radiator.*

*18. The method of claim 12, wherein the sacrificial anode is grounded.*

*19. The method of claim 12, wherein installing the sacrificial anode assembly further comprises: installing the sacrificial anode assembly within the fluid flow of the radiator.*

*20. The method of claim 12, wherein the radiator comprises aluminum.*

*21. The method of claim 12, wherein the hot liquid is coolant.*

*22. The method of claim 12, wherein the hot liquid is water.*

*23. The method of claim 12, wherein the hot liquid is antifreeze.*

*24. The method of claim 12, further comprising installing a second sacrificial anode assembly within the radiator.*

*25. A radiator for use in a motor vehicle, the radiator further comprising:*

*a hot liquid inlet to the radiator from an engine of the motor vehicle, the hot liquid inlet providing fluid communication for fluid flow of hot liquid from the engine; and*

*a sacrificial anode installed within 10 inches of the hot liquid inlet of the radiator.*

*26. The radiator of claim 25, wherein the sacrificial anode consists essentially of an active metal.*

*27. The radiator of claim 26, wherein the active metal is at least one of aluminum, magnesium, and zinc.*

*28. The radiator of claim 25 wherein the sacrificial anode is installed in a fitting hole penetrating the radiator.*

*29. The radiator of claim 25 wherein the sacrificial anode is installed onto a surface of the radiator.*

*30. The radiator of claim 25 wherein the sacrificial anode is grounded to the motor vehicle.*

*31. The radiator of claim 25 wherein the radiator comprises aluminum.*

*32. The radiator of claim 25 wherein the radiator enables air-cooling of the hot liquid.*

*33. The radiator of claim 25, further comprising a second sacrificial anode.*

*34. The radiator of claim 25, wherein the hot liquid is coolant.*

*35. The radiator of claim 25, wherein the hot liquid is water.*

*36. The radiator of claim 25, wherein the hot liquid is antifreeze.*

*37. An electrolysis prevention device for preventing corrosion, the electrolysis prevention device comprising:*

*a sacrificial anode made of an active metal; and*

*an anode holder supporting the sacrificial anode, the anode holder adapted for installation in an engine radiator within 10 inches of a hot liquid inlet to the engine radiator.*

*38. The electrolysis prevention device of claim 37, wherein the sacrificial anode comprises aluminum.*

*39. The electrolysis prevention device of claim 37, wherein the sacrificial anode comprises magnesium.*

*40. The electrolysis prevention device of claim 37, wherein the sacrificial anode comprises zinc.*

*41. The electrolysis prevention device of claim 37, wherein the engine radiator is used in a motor vehicle, and wherein the sacrificial anode is grounded to the motor vehicle.*

*42. The electrolysis prevention device of claim 37, wherein the engine radiator comprises aluminum.*

*43. The electrolysis prevention device of claim 37, wherein the anode holder enables the sacrificial anode to be located within fluid flow of the hot coolant inlet.*

*44. The electrolysis prevention device of claim 37, wherein the anode holder is installed in a fitting hole penetrating the engine radiator.*

*45. The electrolysis prevention device of claim 37, wherein the hot liquid is coolant.*

*46. The electrolysis prevention device of claim 37, wherein the hot liquid is water.*

*47. The electrolysis prevention device of claim 37, wherein the hot liquid is antifreeze.*

* * * * *